United States Patent Office 3,391,224
Patented July 2, 1968

3,391,224
MAR-RESISTANT POLYESTER RESINS FOR OPHTHALMIC LENSES
Allan Ellis Sherr, Martinsville, N.J., and Alexander Christian Bristol, Sylmar, Calif., assignors to American Cyanamid Company, Stamford, Conn., a corporation of Maine
No Drawing. Continuation-in-part of application Ser. No. 516,658, Dec. 27, 1965. This application Aug. 17, 1967, Ser. No. 661,207
3 Claims. (Cl. 260—872)

ABSTRACT OF THE DISCLOSURE

A polyester resin composition composed of (1) the esterification reaction product of fumaric acid, triethylene glycol and 2-ethyl-1,3-hexanediol or 2,2-dimethyl - 1,3-propanediol, (2) methyl methacrylate with or without (3) styrene, and lenses produced therefrom, are disclosed.

CROSS-REFERENCES TO RELATED APPLICATIONS

This application is a continuation-in-part of our co-pending application Ser. No. 516,658, filed Dec. 27, 1965, now abandoned.

BACKGROUND OF THE INVENTION

Polyester resin compositions similar to those disclosed herein have been the subject of various U.S. patents, see, for example, U.S. Patents Nos. 3,264,372, 3,265,763, 3,265,764, 3,294,867, and 3,318,975. The properties of the resins of said patents are excellent for the purposes disclosed, however, the resins are usually not of sufficient quality to enable them to be used for the production of high grade optical lenses. We have now discovered a specific polyester resin system which may be utilized, as such, in the production of optical lenses. Our novel system can be formed into lenses which are haze-free, transparent (optically clear), grindable, shatter-resistant and mar-resistant and additionally, the lenses are not brittle and have a refractive index ($n_D^{25}$) of greater than 1.5. This unique combination of properties cannot be found in resin systems known in the prior art.

SUMMARY

As mentioned above, our novel compositions are useful in the production of lenses. These lenses can be used in instruments such as binoculars, telescopes, microscopes, etc. but are more particularly useful as ophthalmic lenses such as in eyeglasses.

DESCRIPTION OF THE INVENTION INCLUDING PREFERRED EMBODIMENTS

The compositions of the instant invention are composed of (1) the esterification reaction product of fumaric acid, triethylene glycol and from about 1.0% to about 15.0%, based on the OH content of the triethylene glycol, of 2-ethyl-1,3-hexanediol or 2,2-dimethyl - 1,3 - propanediol, otherwise known as neopentyl glycol, (2) from about 5.0% to about 20.0%, by weight, based on the total weight of (1) and (2) of methyl methacrylate and (3) from about 0.0% to about 5.0% by weight, based on the total weight of (1), (2) and (3), of styrene.

The esterification reaction product of the fumaric acid, triethylene glycol and neopentyl glycol or 2 - ethyl-1,3-hexanediol is produced by merely reacting the components, under known conditions, in equimolar amounts of acid and alcohol or from about a 5% to 20% excess of alcohol over that amount stoichiometrically calculated to esterify the carboxyl groups of the acid. The esterification should only be carried out, however, until an acid number of below about 30, preferably between about 5 and about 30, is achieved.

The second component (2) of our novel compositions is methyl methacrylate. This component is present in the amounts mentioned above as a mixture with component (1) until the ultimate composition is converted to the thermoset state.

The third optional component (3) of our novel composition is styrene. This component is also present in the initial, formable composition as a mixture with (1) and (2). The styrene aids the methyl methacrylate in converting the polyester to a thermoset, formable condition. The composition in this condition can then be formed into a lens having the properties mentioned above.

The conversion of the thermosetting mixture to the thermoset composition can be accomplished by the application of heat and/or pressure with or without catalysis. Alternatively, the thermosetting material can be converted to the thermoset state by use of catalysts or initiators only, without resorting to either heat or pressure. The catalytic materials or polymerization initiators which may be used to make such a conversion in state are well-known in the art and have been used extensively for this purpose. Illustrative catalysts include the peroxide catalysts, such as, benzoyl peroxide, tertiary butyl hydroperoxide, di-tertiary butyl peroxide, and cumene hydroperoxide, among many others. The ketone peroxides may also be used, such as, the methyl ethyl ketone peroxide, the diethyl ketone peroxide and the like. The amount of the catalytic material used is conventional, i.e., between about 0.01% and 10%, and more, usually between about 0.1% and 3%, by weight, based on the weight of the total weight of (1), (2) and (3).

As can be ascertained from a perusal of the above cited patents, it is known that glycol diacrylates can be added to esterification reaction products similar to those disclosed above. The addition of these glycol diacrylates, although increasing some properties of the resultant composition such as impact strength, results in the reduction of other properties so that the ultimate system does not possess the unique combination of properties exhibited by our novel system. Similarly, higher amounts of styrene could be added (as well as known refractive index improving monomers) but the addition of these additives upsets the delicate balance of properties we have reached.

If desired, the compositions of the present invention may, however, have incorporated therein, materials which do not function so as to destroy the properties above discussed. For example, ultraviolet light absorbers, photochromic materials, dyes, pigments, etc. may be added in amounts such that they function as desired without destroying other existing, more desirable characteristics of the basic system.

The following examples are set forth for purpose of illustration only and are not meant to be construed as limitations on the present invention except as set forth in the appended claims. All parts and percentages are by weight unless otherwise specified.

POLYESTER RESIN A

Into a suitable reaction vessel equipped with thermometer, stirrer and inert gas inlet and outlet tubes, are introduced 619 parts of triethylene glycol, 580 parts of fumaric acid and 206 parts of 2-ethyl-1,3-hexanediol. The charge is heated at about 150° C. to 200° C. for 28 hours while bubbling carbon dioxide through the reaction mixture so as to provide an inert atmosphere. At the end of the reaction period, a light yellow viscous product having an acid number of 24 is recovered.

Example 1

Into a suitable mixing vessel are charged 88.5 parts of "Resin A" and 10 parts of methyl methacrylate. The charge is thoroughly blended and is then catalyzed by the addition of 1.5 parts of benzoyl peroxide. The resulting composition is then poured into a casting cell composed of two 75 mm. diameter glass plates having a 6 base radius of curvature and sealed by a flexible gasket. The cell is then placed into an oven and heated at 60° C. for 16 hours and 100° C. for 90 minutes. After further gradual heating to 135° C. the cell is removed and opened. A clear transparent lens of 6 base curvature having the properties set forth in Table I, below, is recovered. The lens is useful, as such, or as a grindable lens for eyeglasses.

TABLE I

| Ex. | Polyester Resin, Percent | Methyl Methacrylate, Percent | Styrene, Percent | Mar Resistance, Percent Haze After Revolution | | Impact Strength | | Tensile | | Flexural Modulus, p.s.i.×10$^6$ | $n_D^{25}$ ° |
|---|---|---|---|---|---|---|---|---|---|---|---|
| | | | | 0 | 10 | Izod, f.p.p.i. | Tensile, f.p.p.i. | Modulus p.s.i.×10$^6$ | Elongation, Percent | | |
| 1 | That of Ex. 1, 88.5 | 10 | ---------- | 0.2 | 2.4 | 0.32 | 8.1 | 0.27 | 2.1 | 0.3 | 1.5107 |
| 2 | That of Ex. 1, 78.6 | 20 | ---------- | 0.5 | 2.5 | 0.35 | 7.4±1.3 | 0.33 | 4.1 | 0.34 | 1.5078 |
| 3 | That of Ex. 1, 75.8 | 20 | 3 | 1.0 | 3.0 | 1.1±1.0 | 11.0 | 0.36 | 4.5 | 0.37 | 1.5107 |

Example 4

Following the procedure of Example 1, various compositions are produced with the following formulations of polyester resin, methyl methacrylate and styrene. In each instance, curing of the mixture, (remaining amount being catalyst) in a lens-shaped cell results in articles of manufacture with properties substantially equivalent to those set forth in Table I.

4(a) A mixture of 93.5 parts of a polyester composed of fumaric acid, triethylene glycol and 3% of 2,2-dimethyl-1,3-propanediol having an acid number of 21 and 5 parts of methyl methacrylate.

4(b) A mixture of 92 parts of the polyester of Example 4(a), 5 parts of methyl methacrylate and 1 part of styrene.

4(c) A mixture of 72.8 parts of the polyester of Example 1, 20 parts of methyl methacrylate and 5 parts of styrene.

The lenses of Examples 1–4(c) were ground down by an optician to a lens having a prescription of +1.0–.75L and +1.25–.62R, inserted into eyeglass frames and fitted to a wearer. The glasses satisfactorily corrected the vision of the wearer.

We claim:

1. A composition of matter consisting essentially of a blend of (1) the esterification reaction product of reactants consisting essentially of fumaric acid, triethylene glycol and 1–15%, by weight, based on the OH content of the triethylene glycol, of 2-ethyl-1,3-hexanediol or 2,2-dimethyl-1,3-propanediol, wherein said product has an acid number between about 5 and about 30, (2) from about 5.0% to about 20.0%, by weight, based on the total weight of (1) and (2), of methyl methacrylate and (3) from about 0.0% to about 5.0%, by weight, based on the total weight of (1), (2) and (3) of styrene.

2. The composition of claim 1 in a cured, cross-linked state.

3. An ophthalmic lens produced from the composition of claim 2.

References Cited

UNITED STATES PATENTS

| 3,264,372 | 8/1966 | Deichert et al. | 260—872 |
| 3,318,975 | 5/1967 | Deichert et al. | 260—872 |

FOREIGN PATENTS

| 1,026,975 | 4/1966 | Great Britain. | |

MURRAY TILLMAN, *Primary Examiner.*

J. T. GOOLKASIAN, *Assistant Examiner.*